United States Patent [19]

Castelli et al.

[11] Patent Number: 5,940,825
[45] Date of Patent: *Aug. 17, 1999

[54] ADAPTIVE SIMILARITY SEARCHING IN SEQUENCE DATABASES

[75] Inventors: Vittorio Castelli, White Plains; Chung-Sheng Li, Ossining; Philip Shi-lung Yu, Chappaqua, all of N.Y.

[73] Assignee: International Business Machines Corporation, Armonk, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 08/726,889

[22] Filed: Oct. 4, 1996

[51] Int. Cl.⁶ ........................................... G06F 17/30
[52] U.S. Cl. .......................... 707/6; 707/2; 707/3; 707/7
[58] Field of Search ................................... 707/6, 2, 3, 4, 707/5, 7

[56] References Cited

U.S. PATENT DOCUMENTS

| | | | |
|---|---|---|---|
| 5,329,405 | 7/1994 | Hou et al. | 395/800 |
| 5,416,892 | 5/1995 | Loken-Kim | 395/51 |
| 5,426,779 | 6/1995 | Chambers, IV | 707/6 |
| 5,471,610 | 11/1995 | Kawaguchi et al. | 707/6 |
| 5,497,486 | 3/1996 | Stolfo et al. | 707/7 |
| 5,537,586 | 7/1996 | Amram et al. | 707/3 |
| 5,544,352 | 8/1996 | Egger | 707/5 |
| 5,546,572 | 8/1996 | Seto et al. | 707/3 |
| 5,668,897 | 9/1997 | Stolfo | 382/283 |
| 5,684,999 | 11/1997 | Okamoto | 704/9 |
| 5,706,497 | 1/1998 | Takahashi et al. | 707/5 |
| 5,710,833 | 1/1998 | Moghaddam et al. | 382/228 |
| 5,799,268 | 8/1998 | Boguraev | 704/9 |
| 5,799,301 | 8/1998 | Castelli et al. | 707/6 |
| 5,832,494 | 11/1998 | Egger et al. | 707/102 |

OTHER PUBLICATIONS

Ronald E. Crochiere et al. "Multirate Digital Signal Processing", Prentice–Hall Signal Processing Series, 5 pages, Title Page and Tabel of Contents, no date.

P. P. Vaidyanathan, "Multirate Digital Filters, Filter Banks, Polyphase Networks, and Applications: A Tutorial", Proceedings of the IEEE, vol.78, No. 1,pp. 56–93, Jan. 1990.

Hagit Shatkay et al., "Approximate Queries and Representations for Large Data Sequences", pp. 536–545, IEEE, 1996.

Belur V. Dasarathy, Nearest Neighbor (NN) Norms: NN Pattern Classification Techniques, IEEE Computer Society Press Tutorial, 6 pages. 1991.

C. Faloutsos et al., "Fast Subsequence Matching in Time–Series Databasess", Proc. SIGMOD'94, pp. 419–429, 1994.

Primary Examiner—Thomas G. Black
Assistant Examiner—Frantz Coby
Attorney, Agent, or Firm—Kevin M. Jordan

[57] ABSTRACT

A computer system and method for performing similarity searches which is phase and scale insensitive and which allows similarity searches to be performed at a semantic level. Each sequence in a database is preferably segmented at multiple projections and/or resolution levels. The sequences may represent object having multi-dimensional features such as temporal and/or spatial-temporal data. Preferably, the segmenting logic starts with the finest resolution, and each sequence is parsed into a number of disjointed segments, wherein each segment has uniform features. The uniform features could be segments having a constant slope, or waveform segments representable by a single function. The segments may then be re-sampled into a fixed length vector with appropriate normalization. A label may also be assigned to each segment via conventional clustering/classification methods. The above steps are iterated at successive projections and/or resolution levels until each sequence in the database has been independently segmented and clustered. Thus, the labels are preferably extracted in a pseudo-hierarchical manner in which the label of the lowest resolution representation of the sequence is extracted first. The representation of each time series at various resolutions and/or projections captures different characteristics of the same time series (or 2D/3D objects). Recall that each segment represents a region having uniform features. The segmentation at each individual resolution and/or projection thus enables recognition or emphasis of different characteristics within segments having uniform features.

39 Claims, 9 Drawing Sheets

201
QUERY: FIND ALL SUBSEQUENCES IN THE DATA BASE THAT HAS A "SIMILAR" PATTERN AS THE TEMPLATE

202 TEMPLATE

203

| seq#1 |  | seq#6 |  |
| seq#2 |  | seq#7 |  |
| seq#3 |  | seq#8 |  |
| seq#4 |  | seq#9 |  |
| seq#5 |  | seq#10 |  |

ADAPTIVE SIMILARITY SEARCHING IN SEQUENCE DATABASES

CROSS-REFERENCE TO RELATED APPLICATIONS

The present invention is related to U.S. patent application Ser. No. 08/513,583, entitled "Apparatus and Method for Performing Adaptive Similarity Searching in a Sequence Database," by V. Castelli et al., filed Aug. 10, 1995, now U.S. Pat. No. 5,799,301. The present invention has a common assignee with this copending patent application which is hereby incorporated by reference in its entirety.

FIELD OF THE INVENTION

The present invention is related to an improved computerized information handling system. A more particular aspect of the present invention is related to a computerized method of indexing and retrieving similar sequences from a database in a client/server information handling system.

BACKGROUND

Temporal or spatial-temporal data constitutes a large portion of the data stored in computers. A need exists in many emerging applications for similarity matches as opposed to exact matches on the data. For example, in various commercial applications, such as:
identifying companies with similar growth patterns;
determining products with similar selling patterns;
identifying stocks having similar long or short term price trends;
and in various scientific applications, such as:
identifying specific weather patterns;
identifying specific geological features;
identifying specific environmental pollution; and
identifying specific astrophysics patterns.

A similarity search against a database consisting of a collection of objects usually involves the specification of a target. The objects within a user-defined distance from the target will then be retrieved. Similarity searches usually incorporate a similarity measure or a distance metric. Two patterns are considered to be "similar" if the distance metric is less than a predefined threshold.

One example of a prior art search technique is described by R. Agrawal, C. Faloutsos, and A. Swami, in an article entitled "Efficient Similarity Search in Sequence Database," Fourth International Conference on Foundations of Data Organization and Algorithms, Chicago, October 1993, similarity matches are based on the computation of the mean-square-error of the first few Fourier coefficients of two sequences. However, this method does not address the issue related to scaling and possible phase differences between two sequences. Moreover, the target sequence and the sequences in the database must have the same length. This problem is addressed in C. Faloutsos, M. Ranganathan, and Y. Manolopoulos, "Fast Subsequence Matching in Time-series database," Proc. SIGMOD'94, pp. 419–429, 1994, in which a similarity search is performed on all possible subsequences by generating the first few Fourier coefficients of all possible subsequences of a given length for each sequence. The two-Fourier-coefficient representation of each subsequences can be viewed as a point in two-dimensional feature space. The locations of several points in the Fourier domain, each of which corresponds to a subsequence, can be combined and approximately represented by a rectangle, thus reducing overall storage requirements. This method, nevertheless, does not solve the scaling problem. Another problem is that insufficient information may be retained in the feature space, which can significantly increase the number of false hits.

The aforementioned co-pending U.S. patent application by V. Castelli et al., describes a new method for constructing a database that allows similarity matches which are insensitive to possible scale and phase differences between the sequences stored in the database and the target sequence. Furthermore, many more features from the original temporal and/or spatia-temporal sequences are retained, thus reducing the possibility of false hits. In this method, each sequence to be stored in the database is segmented into non-overlapping or minimally overlapping subsequences of equal length. Each subsequence is then normalized (such as with respect to the energy or maximum amplitude of each sequence) and transformed into a series of coefficients in the feature space. A search is performed based on a hierarchical correlation in the feature space between the target sequence and the subsequences. The target sequence and the stored sequences are correlated first at the lowest level in the hierarchy. At any given level, a match is declared when the correlated result is larger than a predetermined threshold. Sequences that fail to satisfy the matching criterion are discarded. The process is continued at the next level until the highest level is reached. Because of the hierarchical search, a linear scan of the entire sequence can be avoided. Although this approach is phase and scale insensitive, it does not allow similarity searches to be performed at a semantic level.

Thus, a need exists for a method and system for performing similarity searches which is phase and scale insensitive and which allows similarity searches to be performed at a semantic level. The present invention addresses such a need.

SUMMARY OF THE INVENTION

The present invention is directed to computer system and method for performing similarity searches which is phase and scale insensitive and which allows similarity searches to be performed at a semantic level.

According to the present invention, each sequence in a database is preferably segmented at multiple projections and/or resolution levels. The sequences may represent objects having multidimensional features such as temporal and/or spatial-temporal data. Preferably, the segmenting logic starts with the finest resolution, and each sequence is parsed into a number of disjointed segments, wherein each segment has uniform features. The uniform features could be segments having a constant slope, or waveform segments representable by a single function. The segments may then be re-sampled into a fixed length vector with appropriate normalization. A label may also be assigned to each segment via conventional clustering/classification methods. The above steps are iterated at successive projections and/or resolution levels until each sequence in the database has been independently segmented and clustered. Thus, the labels are preferably extracted in a pseudo-hierarchical manner in which the label of the lowest resolution representation of the sequence is extracted first.

The representation of each time series at various resolutions and/or projections captures different characteristics of the same time series (or 2D/3D objects). Recall that each segment represents a region having uniform features. The segmentation at each individual resolution and/or projection thus enables recognition or emphasis of different characteristics within segments having uniform features.

A computerized method of indexing data sequences for similarity pattern matching, according to the present invention, includes the steps of: generating multiple resolutions and/or projections of a plurality of stored sequences; segmenting the sequences at the multiple resolutions and/or projections, wherein each sequence segment has uniform features; and storing the sequence segments in a computer readable memory.

Another aspect of the present invention includes a method for optimizing a clustering of the segments by iteratively refining the segmenting step. The clusters are then evaluated for each iterative refinement; and the iterative refinement having an optimal clustering performance is selected.

Still another aspect of the present invention is directed to a genetic method for clustering classified segments, including the steps of: generating a seed segmentation during the segmenting step, wherein the seed segmentation represents an initial constellation of a cluster centroid; generating multiple perturbations of the seed segmentation by adding a randomly generated vector having an increased magnitude to each cluster centroid; classifying the sequence segments for each perturbation; evaluating the clusters classified for said each perturbation; and selecting the perturbation having an optimal clustering performance. The evaluating step may include the step of comparing a gain in clustering performance with a predetermined threshold; and terminating the generation of perturbations when the gain does not exceed the threshold.

According to the present invention, a query into the multi-resolution and/or projection sequence segment database can be specified in two ways:

the query could consist of a series of the symbols from the vocabulary of the clustering output; or a sample sequence template may be provided as an example.

The query sequence may be a template sequence or a series of symbols from a vocabulary of a classifier. A method according to the present invention for detecting a similarity between the query sequence and one or more data sequences stored in a database, wherein the data sequences have been segmented at multiple resolutions and/or projections, includes the steps of: generating multiple resolutions and/or projections of the query sequence; segmenting the query sequence into a series of high-level objects, wherein each query sequence segment has uniform features; progressively searching the database and retrieving a query sequence segment stored in the memory having similar causality relationships as a template sequence segment; and combining matching segments and scoring combined sequences.

According to another aspect of the present invention, the searching step includes searching at increasingly higher resolutions only when a match is found at one of a previous resolution and projection and combining match results at the increasingly higher resolutions.

BRIEF DESCRIPTION OF THE DRAWINGS

These and other features and advantages of the present invention will become apparent from the following detailed description, taken in conjunction with the accompanying drawings, wherein.

DETAILED DESCRIPTION

Figure 1:
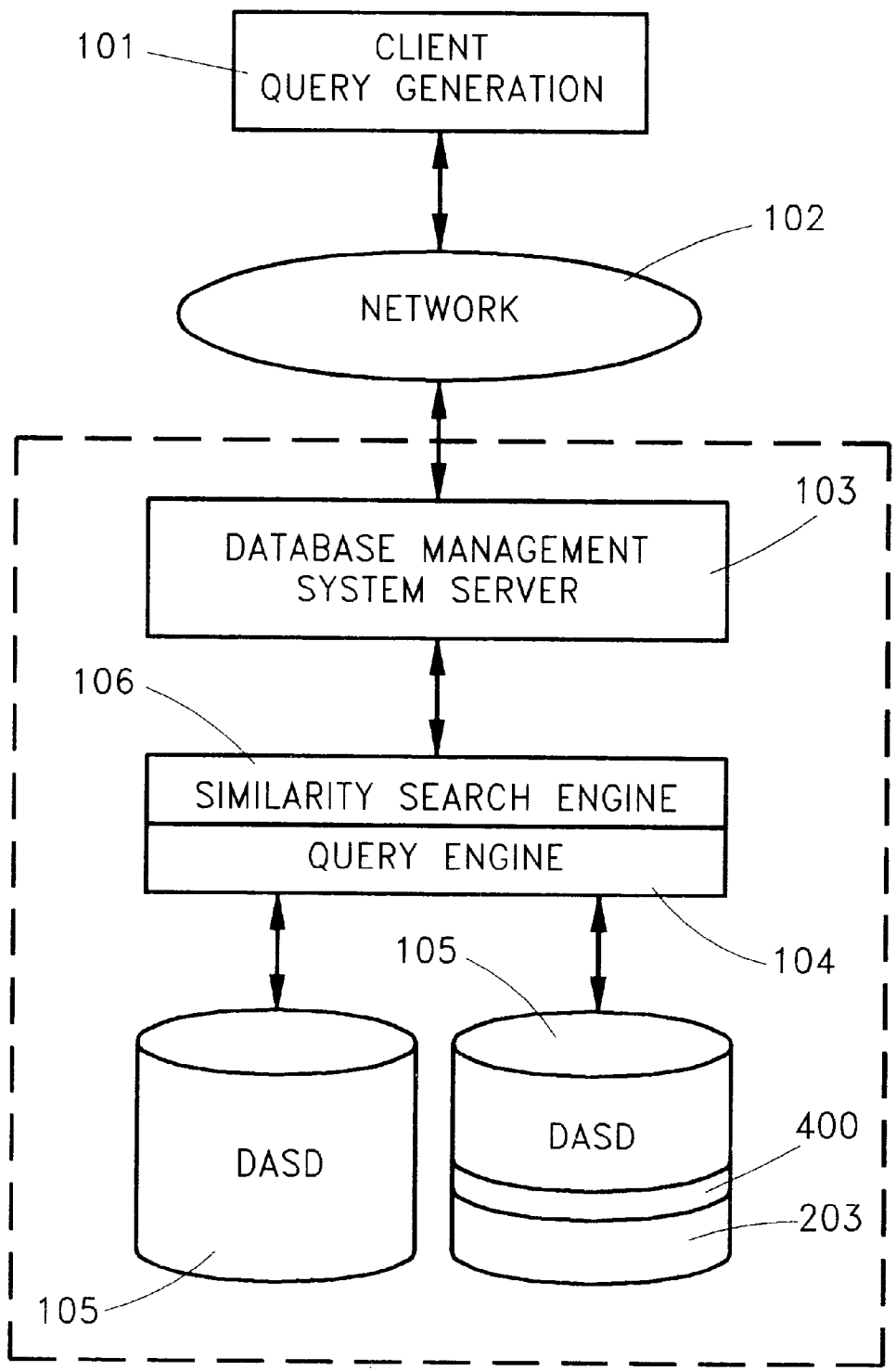
FIG. 1 is a system diagram illustrating a client/server database management system having features of the present invention.

The present invention is directed to a system and method for performing similarity searches in a sequence database at the semantic level wherein the system and method are insensitive to scaling and possible phase differences between the two sequences. FIG. 1 illustrates a client/server architecture and database management system having features of the present invention for performing similarity matches as a possible data mining operation. As depicted, a user issues a query from a client system 101 through the network 102 to the database management system server 103. Note that in such a client/server environment, multiple clients and servers can be configured such that the data in the database is either partitioned or replicated among database management servers. The query is then processed by the query engine 104 according to the search criteria specified by or generated from the query. Examples of query processing in accordance with the present invention will be discussed with reference to FIGS. 2–3 and FIGS. 8–9. The query engine 104 searches the database stored on DASD 105 (direct access storage devices) connected to the system. The query results are then transmitted back to the client through the network.

A similarity search engine 106 in accordance with the present invention is preferably implemented as computer software in the query engine 104. As will be discussed with reference to FIG. 3, the similarity search engine 104 has features which allow a fuzzier search (although in a controlled manner).

The multiple resolution and/or projection data segmenting and clustering logic 400 according to the present invention will be discussed in detail with reference to FIG. 4. As will be discussed with reference to FIG. 5, each sequence in the database is preferably represented at multiple projections and/or resolution levels. Sequences mapped to different projections usually carry uncorrelated information, while different resolutions carry increasingly more detailed information as the resolution is increased. Preferably, the segmenting and clustering logic 400 starts with the finest resolution, and each sequence in the database is segmented into a number of disjointed segments, wherein each segment has uniform features. The uniform features could be segments having a constant slope, or waveform segments representable by a single function. Preferably, each segment is then re-sampled into a fixed length vector with appropriate normalization. A label may also be assigned to each segment via conventional clustering/classification methods. The above steps are iterated at successive projections and/or resolution levels until each sequence in the database has been independently segmented and clustered. Thus, the labels are preferably extracted in a pseudo-hierarchical manner in which the label of the lowest resolution representation of the sequence is extracted first.

The representation of each time series at various resolutions and/or projections captures different characteristics of the same time series (or 2D/3D objects). Recall that each segment represents a region having uniform features. The segmentation at each individual resolution and/or projection thus enables recognition or emphasis of different characteristics within segments having uniform features.

Figure 2:
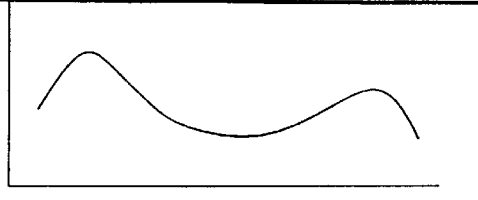
FIG. 2 illustrates a method of performing similarity sequence matching between a query sequence template and a database containing 10 sequences.
Figure 2:
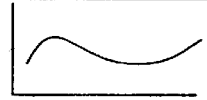
Figure 2:
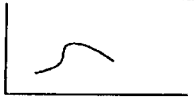
Figure 2:
Figure 2:
Figure 2:
Figure 2:
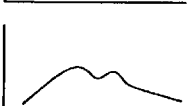
Figure 2:
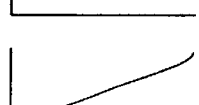
Figure 2:
Figure 2:
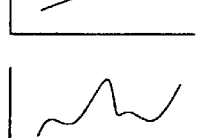
Figure 2:
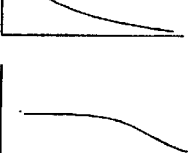

FIG. 2 illustrates a method of similarity sequence matching between a query sequence template and a database containing 10 sequences. As depicted, a sequence template 202 is used to search 10 temporal sequences 203 stored in the database stored on DASD 105. Each time sequence could, for example, represent stock price fluctuations, quarterly sales volume, or a bond yield. A query 201 issued by a client 101 could seek to identify sequences having trends similar to the template 202. A more detailed example of a search process in accordance with the present invention will be discussed with reference to FIG. 9.

Figure 3:
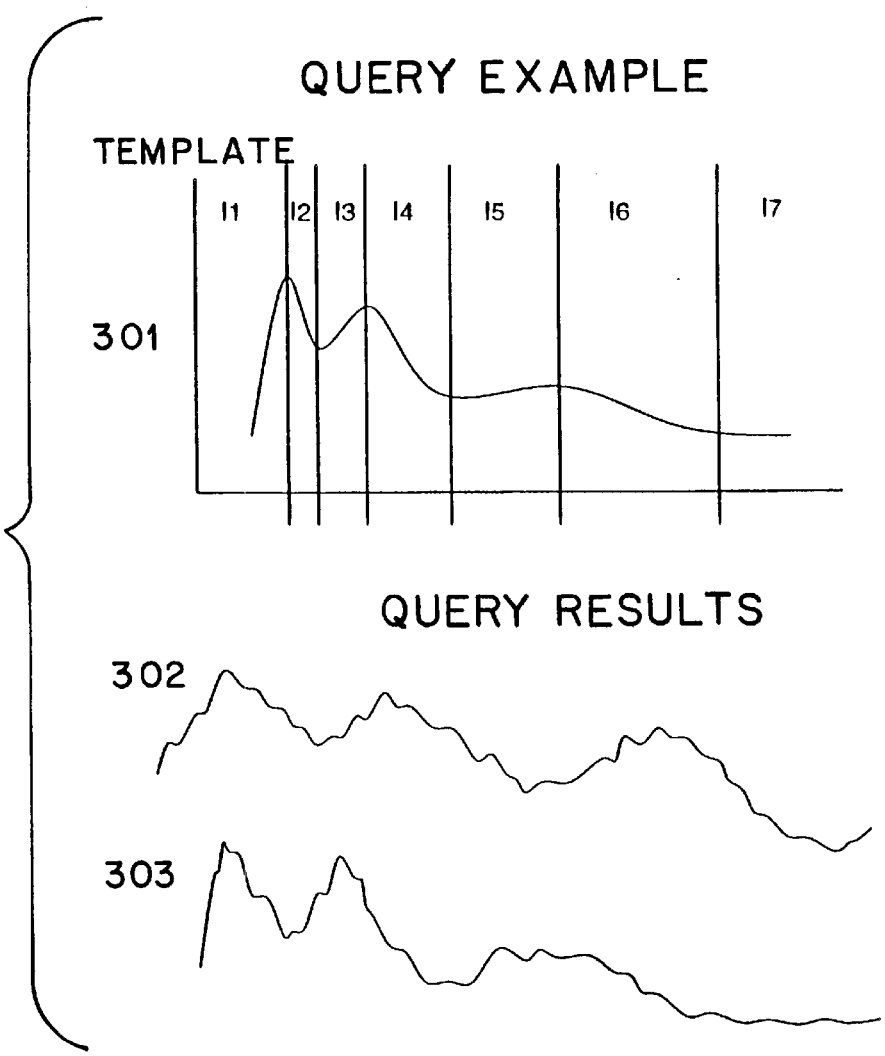
FIG. 3 illustrates an example of a query sequence template segmenting process, and two returned similar sequences.

FIG. 3 illustrates an example of a query sequence template segmenting process, and two returned similar sequences. Here, the template 301 specified by the user is parsed into seven segments: from I1 to I7. An example of a template parsing mechanism in accordance with the present invention will be described in more detail in FIG. 8. The template parsing logic could be executed dynamically on the client 101 or on the server 103. In the case of a system supplied template, the segmentation could have been pre-processed. After parsing, each segment may be represented by a feature vector, such as the first few Fourier coefficients from the Discrete Fourier Transform of the normalized segment or the slope of the segment. Alternatively, each segment can be captured qualitatively (and thus at a higher semantic level), such as "rise", "fall", "flat", "rapid fall", and "rapid rise". This will allow a fuzzier search of each individual segment. In this example, two results 302 and 303 are retrieved using the template 301 and similarity search engine 106 (to be described with reference to FIG. 9) from the sequence database stored in DASD 105. Although these sequences have jagged segments, their overall trends are similar to the template.

Figure 4:
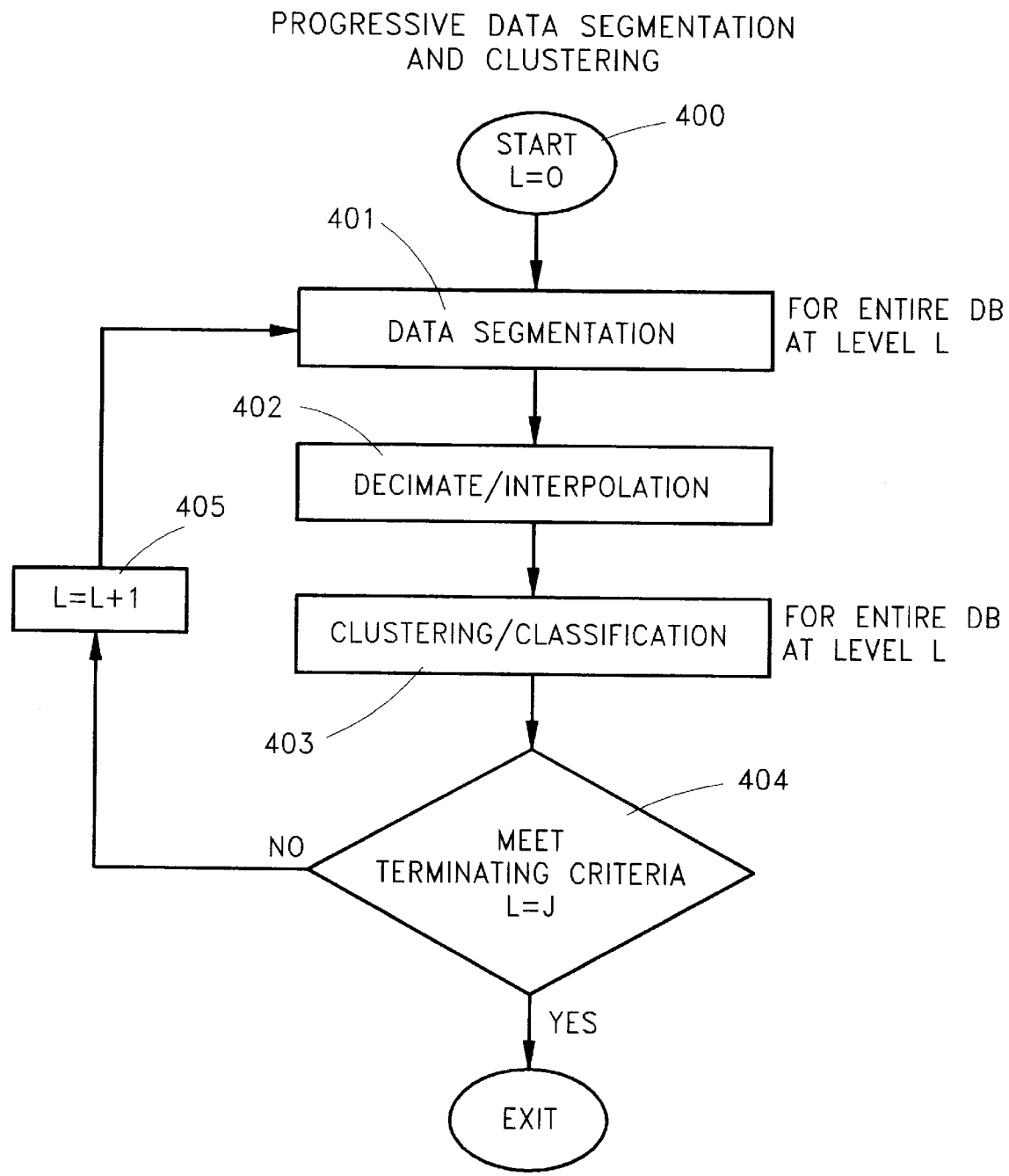
FIG. 4 is a flowchart for a multiple resolution and/or projection database segmenting and clustering logic of FIG. 1.

FIG. 4 is a flowchart for a multiple resolution and/or projection database segmenting and clustering logic 400 of FIG. 1. As will be discussed with reference to FIG. 5, each sequence is preferably transformed at multiple resolution levels and/or projections 500–507. Returning to FIG. 4, the method starts with the lowest resolution (resolution level L=0). In step 401, each sequence in the database is segmented into a number of disjointed segments, wherein each segment has uniform features. Methods for segmenting time series, such as stock sequences, are well known. See, e.g., H. Shatkay and S. B. Zdonik, "Approximate Queries and Representations for Large Data Sequences," Proc. ICDE, pp. 536–545, February 1996. In step 402, each segment is preferably re-sampled into a fixed length vector with appropriate normalization. This usually involves either interpolation or decimation. There are well known methods for interpolation and decimation of time series. See, e.g., Crochiere, "Multirate Digital Signal Processing," Prentice Hall, 1983. In step 403, a label may be a assigned to each segment via conventional clustering/classification methods such as k-means, or Kohonen self-organization maps. Various well known classification methods can be found, for example, in "Nearest Neighbor Pattern Classification Techniques," by Belur Dasarathy, IEEE Computer Society, 1991. In steps 404 and 405, the above steps are iterated at increasing resolution levels, i.e., from level L=0 to level L=J until, in step 404 the terminating condition is met. As a result, each resolution of each sequence is segmented and clustered independently. Thus, the labels are preferably extracted in a pseudo-hierarchical manner in which the label of the lowest resolution representation of the sequence is extracted first.

Figure 5:
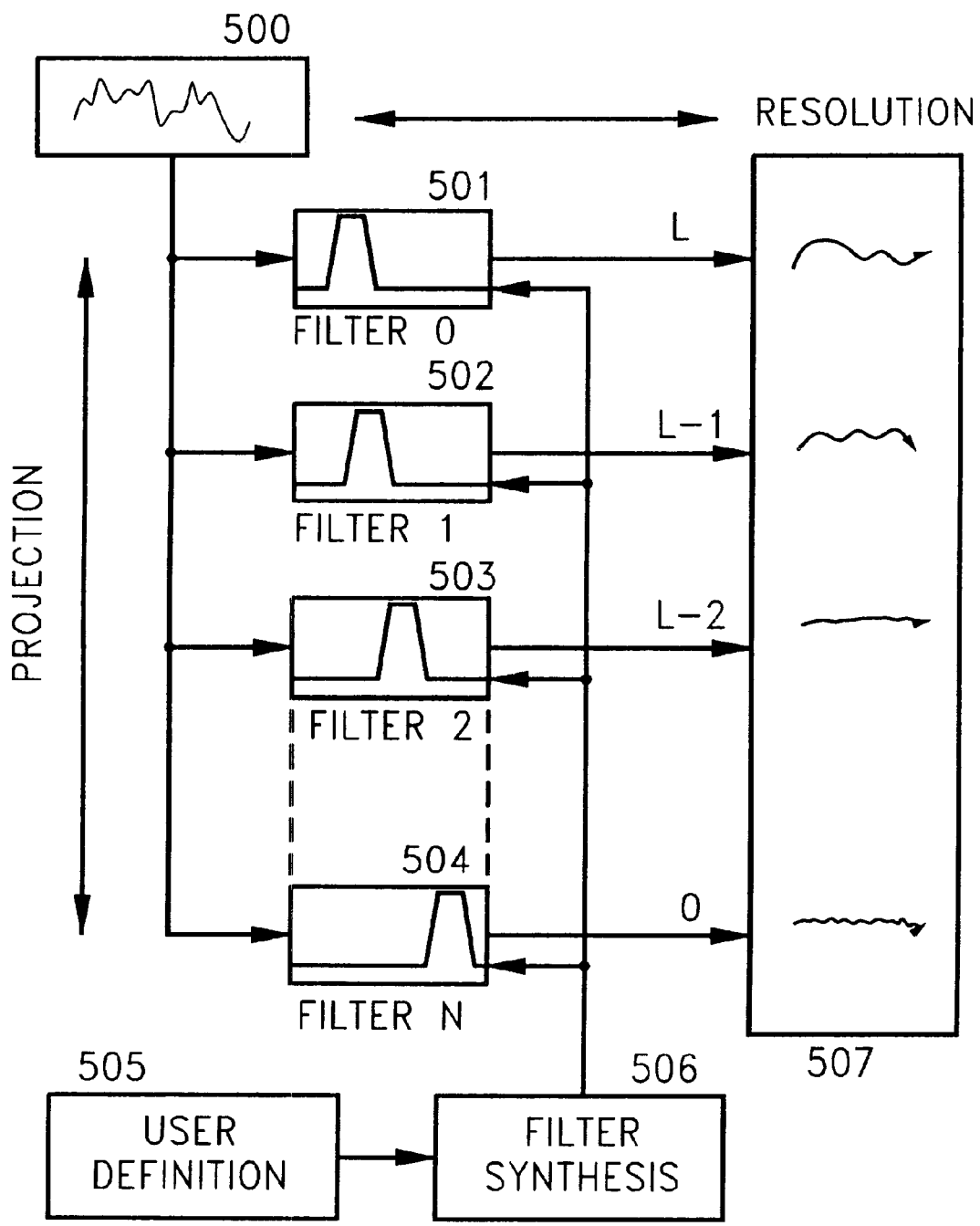
FIG. 5 depicts a sub-band filter bank system for generating multiple resolutions and/or projections of a time series sequence in accordance with the present invention.

FIG. 5 depicts a sub-band filter bank system for generating multiple resolutions and/or projections of a time series sequence in accordance with the present invention. One way to construct a multiple resolution representation is to assign the lowest frequency band (output from the first filter 501 in the filter bank) as resolution level L. Resolution level i can be obtained by combining the outputs from filter #1 to filter # (L-i) in the filter bank. Resolution level 0 can be obtained by combining the outputs from all the filters in the filter bank. Progressive representations of time series is well known in the art, and can be found, for example, in P. P. Vaidyanathan, "Multirate Digital Filters, Filter Banks, Polyphase Networks, and Applications: A Tutorial", Proceedings of the IEEE, vol. 78, no. 1, January 1990. Referring again to FIG. 5, a time series 500 passes through a filter bank 501–504 and generates output 507. The center frequency of each filter in the filter bank 501–504 is positioned differently and can be can synthesized by a filter synthesizer 506 according to user specifications 505. Extraction of features such as mean, energy, histograms, and Fourier coefficients from time series is also well known. However, segmentation of time series at multiple resolutions and/or projections, either hierarchically or independently is not known to have been discussed previously.

According to the present invention, each resolution of each sequence is preferably segmented and clustered independently. As a result, the labels are extracted in a pseudo-hierarchical manner in which the label of the lowest resolution representation of the sequence (or highest level) is extracted first. The representation of each time series at various resolutions captures different characteristics of the same time series (or 2D/3D objects). Recall that each segment represents a region having uniform features. The segmentation at each individual resolution and/or projection thus enables recognition or emphasis of different characteristics within segments having uniform features.

Note that the segmentation is closely related to clustering, and heavily depends on the vocabulary of the clustering/classification. As a simple example, the vocabulary of the clustering/classification can consists of only rise, flat, and fall for the sequence database. Each category can be further divided into steep and slow. A time series of stock price fluctuations can thus be parsed into segments of slow rise, flat, fast rise, slow fall, steep rise, etc. The vocabulary used for the clustering may thus be a high-level object which can have certain semantic meaning.

Figure 6:
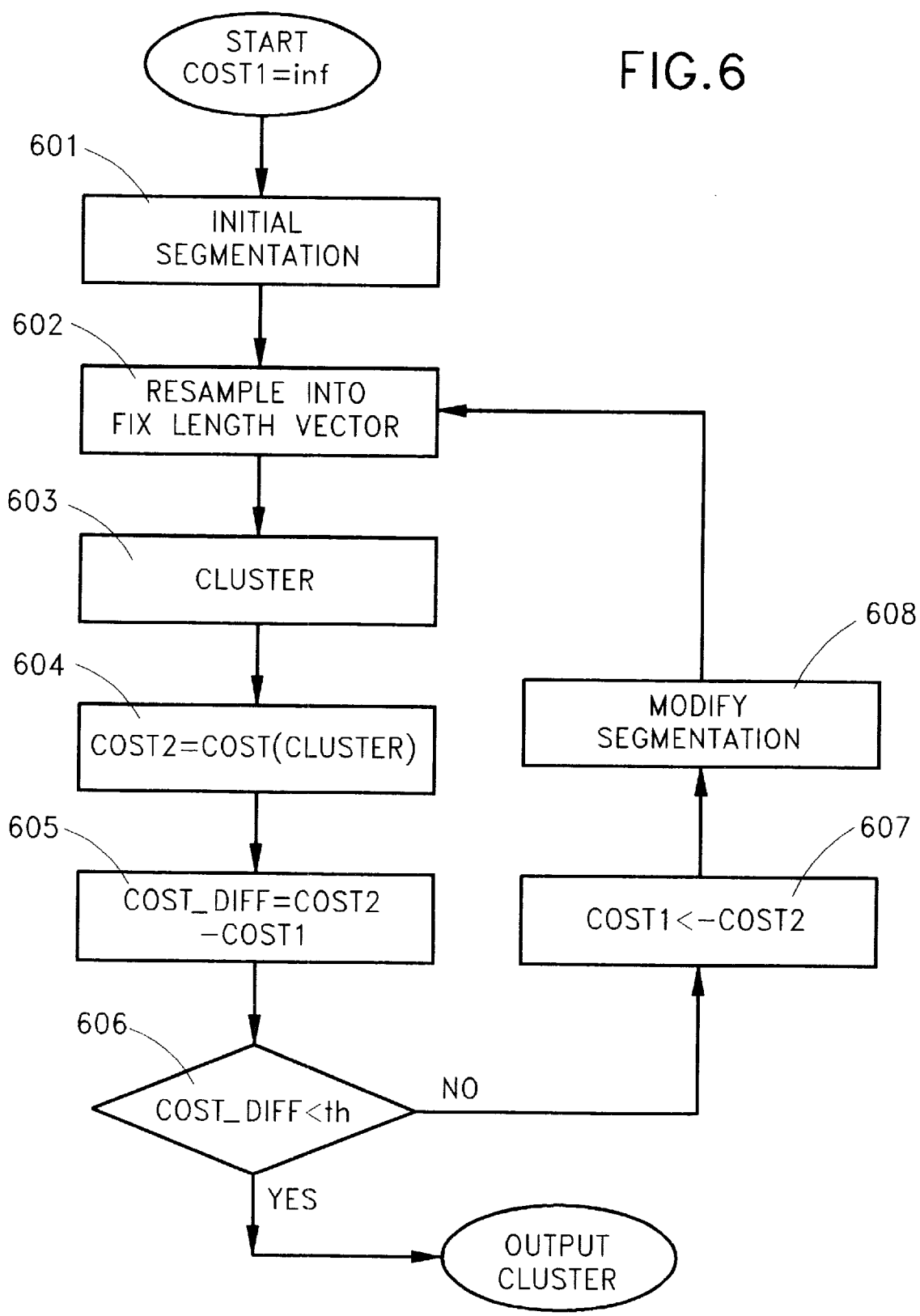
FIG. 6 is a flowchart of an alternative iterative refinement method for the database segmenting and clustering logic of FIG. 4.

FIG. 6 is a flowchart of an alternative iterative refinement method for the database segmenting and clustering logic of FIG. 4. As depicted, the variable COST1 may be initially assigned to a very high or even infinite value. In step 601, a seed segmentation can be used to parse the entire database. Seed segmentation is well known in the art. See for example, Shatkay and Zdonik, "Approximate Queries and Representations for Large Data Sequences," Proc. ICDE, pp. 536–545, February 1996. In step 602, each segment is re-sampled, and in step 603, clustered (step 403 in FIG. 4). In step 604, the performance of each cluster configuration is evaluated based on a specific performance metric. The performance metric of a cluster can be defined, for example, as the mean variance of the clusters. In this case, the clustering variance decreases as the performance of the configuration improves. In step 605, the difference between the performance metric of the current configuration and the previous configuration is calculated. In step 606, if the difference is smaller than a certain predefined threshold, this cluster configuration is accepted as the final output cluster. Otherwise, in step 607, the cost (performance metric) of the current configuration is reassigned to the cost of the previous configuration. In step 608, a perturbation of the initial segmentation is generated to obtain new clustering results. This perturbation is accepted if the perturbation improves the clustering results. This process repeats until the clustering performance levels off, in step 606.

Figure 7:
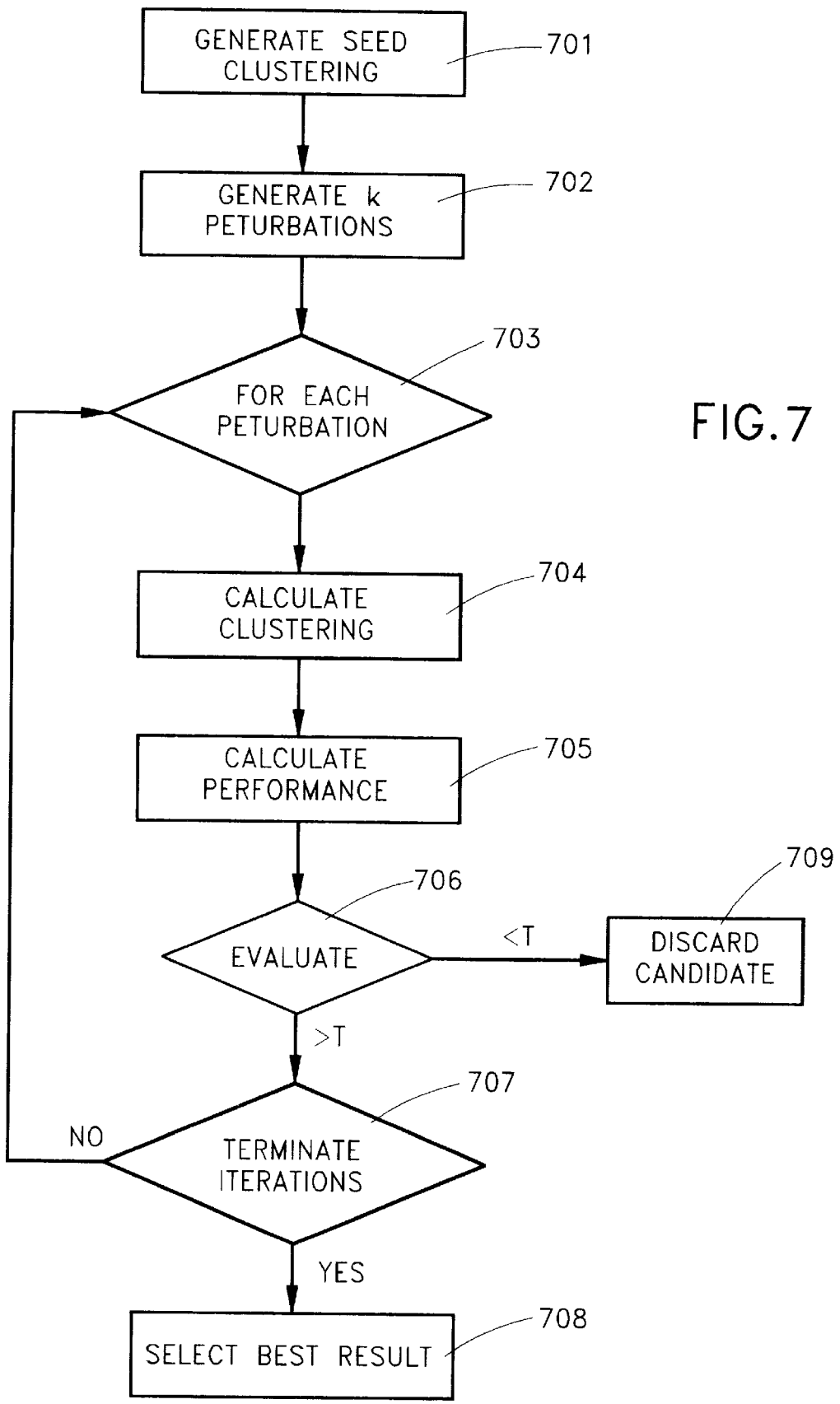
FIG. 7 is a flowchart of a genetic clustering method in accordance with the present invention.

FIG. 7 depicts an alternative, i.e., genetic method which can be used for iterative refinement of the clustering step 403. Techniques of applying genetic algorithms are well known. See for example, M. Melanie, "An Introduction to Genetic Algorithms," MIT Press, 1996. Genetic algorithms generate "mutations" of a single seed. The mutations compete against each other with only the best mutations surviving. This process is continued until a terminal condition is reached. As depicted, in step 701, a seed for clustering is generated using a conventional initialization technique, where the seed is the initial constellation of a cluster centroid. The seed may be randomly generated, but other conventional techniques such as selecting the first n clusters or a deterministic sampling may be used. In step 702, multiple perturbations of the seed are simultaneously generated by adding a randomly generated vector with a small magnitude to each cluster's centroid. In steps 703 and 704, a new clustering result is calculated for each perturbation (analogous to step 604). In step 705, the performance of the new clustering results is calculated (analogous to step 605). In steps 706 and 709, respectively evaluate and discard those perturbations which do not meet the threshold. Unsuitable perturbations can be discarded using many different strategies, including, but not limited to: discarding all but the n perturbations having the best clustering performance, where n is a fixed, user-defined parameter; discarding all the perturbations that have a performance worse than the best performance at the current iteration plus $\delta$, where $\delta$ is a user-defined parameter that may change with time; discarding all perturbations having worse performance than the parent or the ancestor (or the best ancestor if cross-over techniques are used) of m previous generations, where m is a user-defined parameter, greater than or equal to 1; and, combinations of the above.

In step 707, if the termination criterion is not met, the previous steps are repeated for each of the remaining perturbations. Many different strategies can be used to terminate the genetic algorithm, including, but not limited to: repeating the algorithm for N steps, where N is a user-defined parameter; stop iterating over perturbances if the gain in clustering performance is lower than a user-specified threshold $\epsilon$: and, terminating the algorithm when the iteration over all existing perturbations has been completed; and a combination of the above strategies. Those skilled in the art will appreciate that the genetic clustering method of FIG. 7 could also combine some of the existing perturbations, at any step, using conventional cross-over techniques.

According to the present invention, a query into the multi-resolution and/or projection sequence segment database can be specified in two ways:

the query could consist of a series of the symbols from the vocabulary of the clustering output; or a sample sequence template may be provided as an example.

Figure 8:
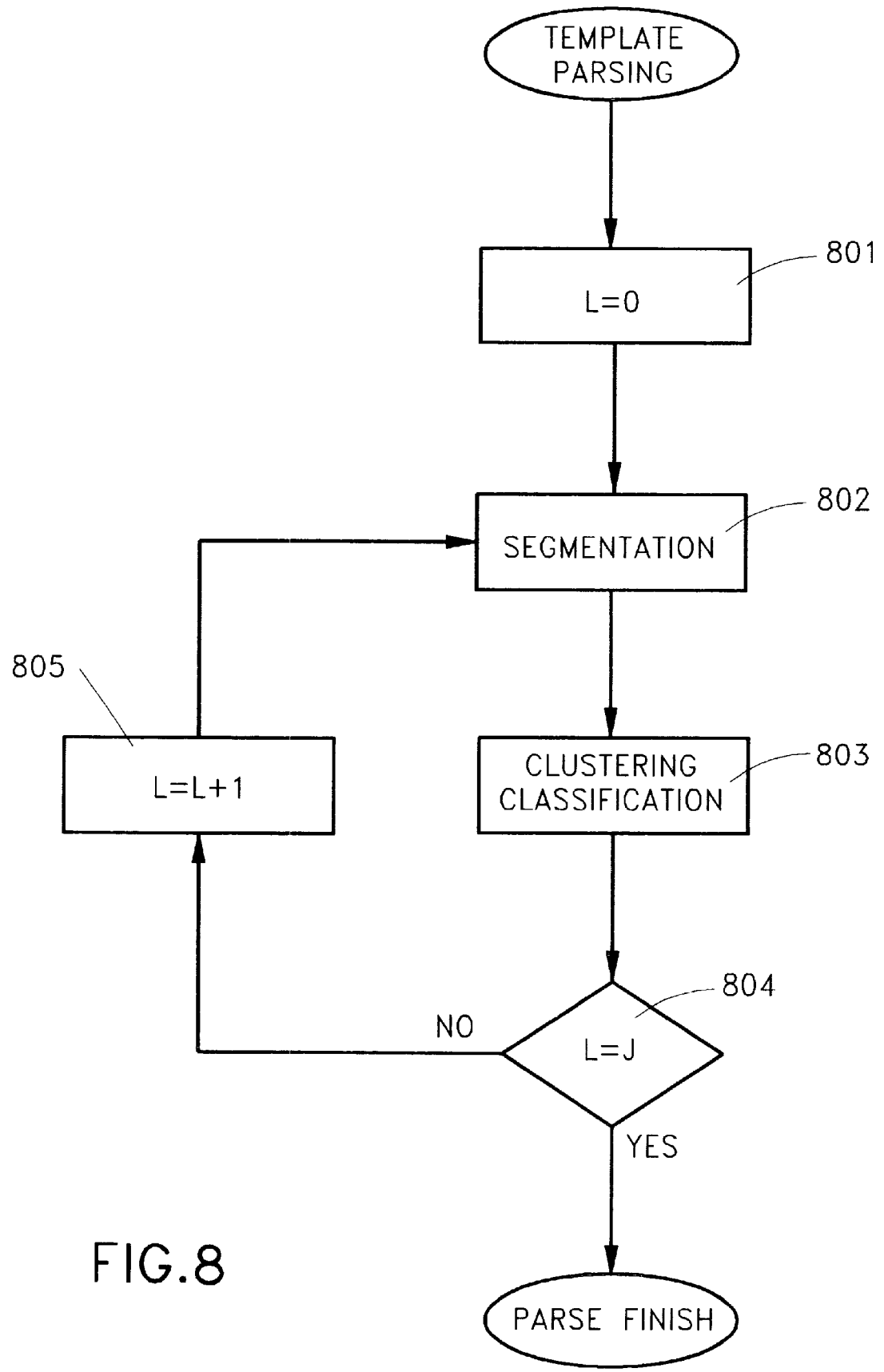
FIG. 8 is a flowchart of a multiple resolution and/or projection query template segmenting and clustering logic having features of the present invention.

FIG. 8 is a flowchart of a multiple resolution and/or projection query template segmenting and clustering logic having features of the present invention. This method is similar to the parsing of the original sequence database described in FIG. 4. In step 801, the template is segmented into a number of disjointed segments, wherein each segment has uniform features. In step 802, each segment is re-sampled into a fixed length vector with appropriate normalization. This usually involves either interpolation or decimation. As discussed with reference to FIG. 4, methods for segmenting time series, such as stock sequences, are well known, as are methods for interpolation and decimation of time series. In step 803, a label may be assigned to each segment via conventional clustering/classification methods such as k-means, or Kohonen self-organization maps. Various classification methods can be found, for example, in "Nearest neighbor pattern classification techniques," by Belur Dasarathy, IEEE Computer Society, 1991. In steps 804 and 805, the above steps are iterated for successive projections and/or increasing resolution levels, i.e., from level L=0 to level L=J until in step 804, the terminating condition is met. As a result, segmentation is performed on different projections and/or resolution levels of the same sequence.

The search process comprises matching the labels derived from the user query (or parsed from the sequence example given by the user) to the sequence database.

Figure 9:
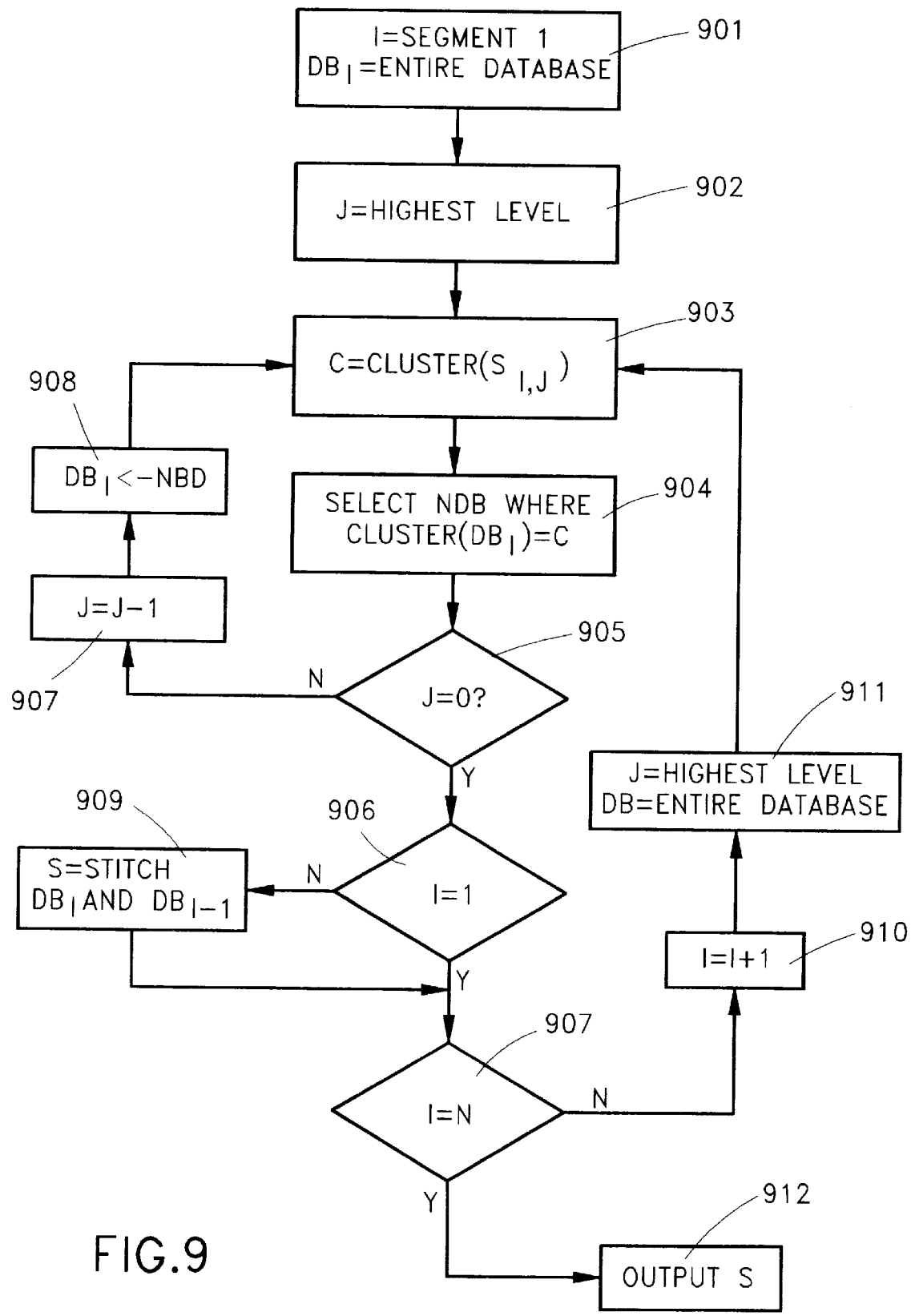
FIG. 9 is a flowchart of a query sequence similarity search engine 106 having features of the present invention.

FIG. 9 is a flowchart of a query sequence similarity search engine 106 having features of the present invention. In step 902, the search starts from the highest level (or lowest resolution), and the search results can be combined with the results derived from the lower levels (or higher resolution) in the following two ways:

matching at a lower level (and thus higher resolution) is only performed on results which are matched to the template at higher levels (and thus lower resolution), so that the matching process at higher levels serves as a filter; or matching at a lower level is combined with results from higher levels. For example, the combination could be an intersection or union of the matches at various levels.

Preferably, the search results at higher levels (lower resolution) are used as filters. As depicted, in step 901, the variable I is initialized to 1, while the variable DBi is assigned to the entire sequence database. In step 902, the variable J is assigned to the highest level of the data representation, and thus the lowest resolution. In step 903, the clustering process is performed on a segment from the template at a specific resolution level, generating a label C. In step 904, this cluster label C is used to locate segments from the database with identical labels. The variable NDB is used to store the temporary search results that have the cluster label C. The loop formed by steps 903–908 repeats the process from the highest level (J) downward, until the lowest level (zero) of a specific segment from the template is reached, in step 905. As discussed, matching at lower levels (and thus higher resolution) is only performed on results which are matched to the template at higher levels (and thus lower resolution), so that the matching process at higher levels serves as a filter.

Note that the matching is performed for each segment of the template sequence. The results may be stitched together, and a score function can be defined for each outcome. The stitching operation may be performed as follows: Suppose sequence A contains segments a1,a2,a3, sequence B contains a1,b2,b3, and sequence C contains c1,b2,c3. The search results for template a1b2 will be {A,B } for the first segment and {B,C} for the second segment. The stitching operation performs a database "join" operation, resulting in sequence B as the final answer.

As another example, if an indefinite length of flat segment is allowed between rise and fall, then the search score of a sequence without an intervening flat region is higher than that of a sequence with a flat region.

Now that the invention has been described by way of the preferred embodiment, various modifications and improvements will occur to those of skill in the art. Thus, it should be understood that the preferred embodiment has been provided as an example and not as a limitation. The scope of the invention is defined by the appended claims.

What is claimed is:

1. A computerized method of indexing data sequences for similarity pattern matching, comprising the steps of:
   generating representations selected from the group consisting of one or more of multiple resolutions and projections, of a plurality of stored sequences;
   segmenting the sequences at said one or more of multiple resolutions and projections, wherein each sequence segment has uniform features; and
   storing sequence segments in a computer readable memory.

2. The method of claim 1, further comprising the steps of:
   normalizing said each sequence segment; and
   classifying said each sequence segment, in response to said normalizing step.

3. The method of claim 1, wherein said storing step comprises the step of storing each sequence segment into a hierarchy of said one or more of multiple resolutions and projections.

4. The method of claim 2 wherein said generating step comprises the step of transforming the sequences by one of sub-band filtering and wavelet transformation.

5. The method of claim 2, wherein said classifying step comprises the step of classifying said each sequence segment at progressively higher resolutions.

6. The method of claim 2, further comprising the steps of:
   optimizing sequence segment clusters by iteratively refining said segmentation step;
   evaluating the clusters, in response to each iterative refinement; and
   selecting an iterative refinement having an optimal clustering performance, in response to said evaluating step.

7. The method of claim 1 wherein the sequences represent objects having multi-dimensional features including one of temporal and spatial-temporal data.

8. The method of claim 2, further comprising a genetic method for clustering classified segments, comprising the steps of:
   said segmenting step including the step of generating a seed segmentation, wherein the seed segmentation represents an initial constellation of a cluster centroid;
   generating multiple perturbations of the seed segmentation by adding a randomly generated vector having an increased magnitude to each cluster centroid;
   said step of classifying sequence segments is performed for each perturbation;
   evaluating the clusters, classified for said each perturbation; and
   selecting the perturbation having an optimal clustering performance.

9. The method of claim 8, wherein said evaluating step includes the step of comparing a gain in clustering performance with a predetermined threshold; and terminating said step of generating multiple perturbations when the gain does not exceed the threshold.

10. The method of claim 2, wherein said classifying step includes the step of generating labels corresponding to a clustering vocabulary, said method further comprising the step of executing a query using the clustering vocabulary against the sequence segments stored in the memory.

11. The method of claim 1 wherein said generating step comprises the step of first generating a dominant projection for maximizing a capture of different characteristics of the sequences.

12. The method of claim 1, for detecting a similarity between a template sequence corresponding to a query and at least one sequence segment stored in the memory, comprising the steps of:
   generating representations selected from the group consisting of one or more of multiple resolutions and projections, of the template sequence;
   segmenting the template sequence at a plurality of said one or more of multiple resolutions and projections, wherein each template sequence segment has uniform features; and
   selecting and retrieving the sequence segment stored in the memory having similar causality relationships as a template sequence segment.

13. The method of claim 12 wherein said selecting step comprises the steps of:
   progressively searching from a lowest resolution level to a highest resolution level; and,
   filtering by combining higher resolution search results only which match lower level resolution search results.

14. A computer database comprising the classified sequences generated by the method of claim 1.

15. A method of detecting a similarity between a query sequence and one or more data sequences stored in a database, wherein the data sequences have been segmented at one or more of multiple resolutions and projections, the method comprising the steps of:
   generating representations selected from the group consisting of one or more of multiple resolutions and projections, of the query sequence;
   segmenting the query sequence into a series of high-level objects, wherein each query sequence segment has uniform features;
   progressively searching the database and retrieving a data sequence segment stored in the memory having similar causality relationships as a query sequence segment; and
   combining matching segments and scoring combined sequences.

16. The method of claim 15 wherein said searching step comprises searching at increasingly higher resolutions only when a match is found at one of a previous resolution and projection.

17. The method of claim 15, wherein said searching step comprises searching at increasingly higher resolutions; and said combining step comprises the step of combining match results at said increasingly higher resolutions.

18. The method of claim 15, further comprising the steps of: normalizing and classifying each query sequence segment at said one or more of multiple resolutions and projections; wherein the query sequence comprises a series of symbols from a vocabulary of said classifying step or a template sequence.

19. The method of claim 15, further comprising the steps of: normalizing and classifying each query sequence segment at said one of multiple resolutions and projections; and searching for similar database segments.

20. A program storage device readable by machine, tangibly embodying a program of instructions executable by the machine to perform method steps for indexing data sequences for similarity pattern matching, said method comprising the steps of:
   generating representations selected from the group consisting of one or more of multiple resolutions and projections, of a plurality of stored sequences;
   segmenting the sequences at said one or more of multiple resolutions and projections, wherein each sequence segment has uniform features; and
   storing sequence segments in a computer readable memory.

21. The program storage device of claim 20, further comprising the steps of:

normalizing said each sequence segment; and classifying said each sequence segment, in response to said normalizing step.

22. The program storage device of claim 20, wherein said storing step comprises the step of storing each sequence segment into a hierarchy of said one or more of multiple resolutions and projections.

23. The program storage device of claim 20 wherein said generating step comprises the step of transforming the sequences by one of sub-band filtering and wavelet transformation.

24. The program storage device of claim 21, wherein said classifying step is comprises the step of classifying said each sequence segment at progressively higher resolutions.

25. The program storage device of claim 21, further comprising the steps of:

optimizing sequence segment clusters by iteratively refining said segmenting step;

evaluating the clusters, in response to each iterative refinement; and selecting an iterative refinement having an optimal clustering performance, in response to said evaluating step.

26. The program storage device of claim 20 wherein the sequences represent objects having multi-dimensional features including one of temporal and spatial-temporal data.

27. The program storage device of claim 20, further comprising a genetic method for optimizing the clusters, comprising the steps of:

said segmenting step including the step of generating a seed segmentation, wherein the seed segmentation represents an initial constellation of a cluster centroid;

generating multiple perturbations of the seed segmentation by adding a randomly generated vector having an increased magnitude to each cluster centroid;

said step of classifying sequence segments is performed for each perturbation;

evaluating the clusters, classified for said each perturbation; and selecting the perturbation having an optimal clustering performance.

28. The program storage device of claim 26, wherein said evaluating step includes the step of comparing a gain in clustering performance with a predetermined threshold; and terminating said step of generating multiple perturbations when the gain does not exceed the threshold.

29. The program storage device of claim 21, wherein said classifying step includes the step of generating labels corresponding to a clustering vocabulary, said method further comprising the step of executing a query comparing the clustering vocabulary against the sequence segments stored in the memory.

30. The program storage device of claim 20 wherein said generating step comprises the step of first generating a dominant projection for maximizing a capture of different characteristics of the sequences.

31. The program storage device of claim 20, comprising the steps of:

segmenting and classifying a template corresponding to a query; and selecting a stored sequence segment having similar causality relationships as a template segments.

32. The program storage device of claim 31 wherein said step of selecting stored sequences comprises the steps of:

transforming each sequence segment into progressively higher sequence resolutions;

wherein said segmenting step is performed at each sequence resolution;

progressively searching from a lowest resolution level to a highest resolution level; and, filtering by combining higher resolution search results only which match lower level resolution search results.

33. A program storage device readable by machine, tangibly embodying a program of instructions executable by the machine to perform method steps for detecting a similarity between a template sequence corresponding to a query and at least one sequence segment stored in the memory, comprising the steps of:

generating representations selected from the group consisting of one or more of multiple resolutions and projections, of the template sequence;

segmenting the template sequence at a plurality of said one or more of multiple resolutions and projections, wherein each template sequence segment has uniform features; and selecting and retrieving the sequence segment stored in the memory having similar causality relationships as a template sequence segment.

34. The program storage device of claim 33 wherein said selecting step comprises the steps of: progressively searching from a lowest resolution level to a highest resolution level; and, filtering by combining higher resolution search results only which match lower level resolution search results.

35. A program storage device readable by machine, tangibly embodying a program of instructions executable by the machine to perform method steps for detecting a similarity between a query sequence and at least one data sequence stored in a database including data sequences which have been segmented at one of multiple resolutions and projections, the method comprising the steps of:

generating representations selected from the group consisting of one or more of multiple resolutions and projections, of the query sequence;

segmenting the query sequence into a series of high-level objects, wherein each query sequence segment has uniform features;

progressively searching the database and retrieving a data sequence segment having similar causality relationships as a query sequence segment; and combining matching segments and scoring combined sequences.

36. The program storage device of claim 35, further comprising the steps of:

normalizing and classifying each query sequence segment at said one or more of multiple resolutions and projections; and searching for similar database segments.

37. The program storage device of claim 36, wherein the query comprises one of a template sequence and a series of symbols from a vocabulary of said classifying step.

38. The program storage device of claim 36, wherein the query includes said template sequence, further comprising the steps of:

said segmenting step including segmenting the template sequence at each resolution along multiple projections, wherein each template sequence segment has uniform features;

normalizing said each template sequence segment.

39. The program storage device of claim 35 wherein said searching step comprises searching at increasingly higher resolutions only when a match is found at one of a previous resolution and projection.

* * * * *